United States Patent
Kumar et al.

(10) Patent No.: US 11,536,916 B1
(45) Date of Patent: Dec. 27, 2022

(54) PATHLOSS OPTIMIZATION FOR OPTICAL SYSTEMS

(71) Applicant: Amazon Technologies, Inc., Seattle, WA (US)

(72) Inventors: Saurabh Kumar, Los Altos, CA (US); Michael Wingate Todd, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/316,545

(22) Filed: May 10, 2021

(51) Int. Cl.
*H04B 10/00* (2013.01)
*G02B 6/42* (2006.01)
(Continued)

(52) U.S. Cl.
CPC ....... *G02B 6/4261* (2013.01); *G02B 6/02085* (2013.01); *G02B 6/4296* (2013.01); *G02B 6/4455* (2013.01)

(58) Field of Classification Search
CPC combination set(s) only.
See application file for complete search history.

(56) References Cited

U.S. PATENT DOCUMENTS 5,606,725 A * 2/1997 Hart ..................... H04H 20/42
725/124
5,790,289 A * 8/1998 Taga .................. H04B 10/2935
398/94

(Continued)

*Primary Examiner* — Agustin Bello
(74) *Attorney, Agent, or Firm* — Klarquist Sparkman, LLP

(57) ABSTRACT

Methods include, for each of a plurality of pluggable optical transceivers that are fiber-coupled to respective inputs of a passive wavelength division multiplexer having a predetermined loss profile defining a path specific loss between each input and a common output, sending an optical output signal along an optical signal path while the other optical transceivers of the plurality are not sending optical output signals and measuring an optical power of the sent optical output signal at an input of a local optical amplifier downstream from an output of the wavelength division multiplexer, wherein the local optical amplifier is configured to transmit the optical output signals to a distant location, and, based on the measured optical powers, determining a loss distribution across the optical output signals at the input of the local optical amplifier by subtracting the predetermined path specific losses of the wavelength division multiplexer, comparing a variation in the loss distribution to a nominal variation to determine a defect in a transceiver fiber path associated with a higher loss component of the distribution where the variation exceeds the nominal variation, comparing an average or maximum loss in the loss distribution to a nominal average or maximum allowable loss to determine a defect in a common fiber path downstream from the multiplexer, and adjusting one or more of the optical powers of the optical output signals produced by the optical transceivers before transmission through the multiplexer, by an optical power offset that produces a predetermined flat optical power spectrum profile at the input of the local optical amplifier and that increases a transmission distance over which the optical output signals decodably propagate.

19 Claims, 5 Drawing Sheets

(51) Int. Cl.
*G02B 6/44* (2006.01)
*G02B 6/02* (2006.01)

(56) References Cited

U.S. PATENT DOCUMENTS

| | | | | |
|---|---|---|---|---|
| 5,801,860 A * | 9/1998 | Yoneyama | H04J 14/0221 | 398/94 |
| 5,894,362 A * | 4/1999 | Onaka | H04B 10/564 | 398/94 |
| 5,923,450 A * | 7/1999 | Dugan | H04B 10/25073 | 398/94 |
| 6,031,647 A * | 2/2000 | Roberts | H04B 10/564 | 398/94 |
| 6,115,157 A * | 9/2000 | Barnard | H04J 14/0221 | 398/1 |
| 6,134,034 A * | 10/2000 | Terahara | H04B 10/564 | 398/1 |
| 6,185,022 B1 * | 2/2001 | Harasawa | H04B 10/077 | 398/9 |
| 6,204,945 B1 * | 3/2001 | Iwata | H04J 14/0221 | 398/9 |
| 6,369,923 B1 * | 4/2002 | Kuo | H04B 10/504 | 398/91 |
| 6,377,730 B1 * | 4/2002 | Bergmann | G02B 6/12019 | 398/79 |
| 6,421,151 B1 * | 7/2002 | Berger | H04B 10/572 | 398/91 |
| 6,445,471 B1 * | 9/2002 | Shimokawa | H04J 14/0221 | 398/79 |
| 6,456,409 B2 * | 9/2002 | Zhou | H04J 14/0221 | 398/79 |
| 6,496,288 B2 * | 12/2002 | Yamane | H04B 10/572 | 372/29.011 |
| 6,574,017 B1 * | 6/2003 | Aono | H04B 10/506 | 398/79 |
| 6,847,788 B2 * | 1/2005 | Nakajima | H04J 14/0279 | 398/195 |
| 6,873,763 B2 * | 3/2005 | Nikonov | H04J 14/02 | 385/37 |
| 6,885,499 B1 * | 4/2005 | Hoshida | H04J 14/0221 | 359/341.41 |
| 7,233,432 B2 * | 6/2007 | Islam | H04J 14/0221 | 398/94 |
| 7,239,807 B2 * | 7/2007 | Simard | H04B 10/25073 | 398/37 |
| 7,389,018 B1 * | 6/2008 | Birk | H04J 14/029 | 385/24 |
| 7,725,033 B2 * | 5/2010 | Nakamoto | H04J 14/0221 | 398/94 |
| 7,969,647 B2 * | 6/2011 | Bolshtyansky | H01S 3/1301 | 359/337.11 |
| 8,340,525 B2 * | 12/2012 | Bai | H04B 10/506 | 398/94 |
| 8,744,265 B2 * | 6/2014 | Effenberger | H04B 10/272 | 398/79 |
| 8,818,190 B2 * | 8/2014 | Hayashi | H04B 10/07955 | 398/94 |
| 8,983,306 B2 * | 3/2015 | Bernasconi | H04B 10/506 | 398/201 |
| 9,225,459 B2 * | 12/2015 | Oda | H04B 10/564 | |
| 9,571,198 B2 * | 2/2017 | Kan | H04B 10/616 | |
| 9,973,836 B1 * | 5/2018 | Salsi | H04J 14/00 | |
| 10,027,421 B2 * | 7/2018 | Binkai | H04B 10/572 | |
| 10,211,917 B1 * | 2/2019 | Wang | H04B 10/07953 | |
| 10,225,016 B1 * | 3/2019 | Khaleghi | H04B 10/25133 | |
| 10,333,622 B2 * | 6/2019 | Bhoja | H04B 10/40 | |
| 10,374,702 B1 * | 8/2019 | Yue | H04Q 11/00 | |
| 10,547,379 B2 * | 1/2020 | Salsi | H04J 14/00 | |
| 10,547,404 B1 * | 1/2020 | Al Sayeed | H04B 10/0797 | |
| 10,965,372 B2 * | 3/2021 | Asada | H04J 14/0212 | |
| 11,070,288 B1 * | 7/2021 | Guzzon | H04B 10/0775 | |
| 11,070,296 B1 * | 7/2021 | Guzzon | H03F 1/3241 | |
| 11,153,009 B1 * | 10/2021 | Parker | H04B 10/07955 | |
| 11,165,502 B2 * | 11/2021 | Ge | H04B 10/0795 | |
| 11,272,271 B1 * | 3/2022 | Khotimsky | H04Q 11/0062 | |
| 11,323,176 B2 * | 5/2022 | Vaez-Ghaemi | H04B 10/071 | |
| 11,323,199 B2 * | 5/2022 | Deng | H04J 14/0221 | |
| 2001/0019436 A1 * | 9/2001 | Nakajima | H04J 14/0246 | 385/27 |
| 2002/0048062 A1 * | 4/2002 | Sakamoto | H04B 10/2916 | 398/30 |
| 2002/0131102 A1 * | 9/2002 | Taneda | H04B 10/07955 | 398/79 |
| 2003/0147647 A1 * | 8/2003 | Funami | H04J 14/0221 | 398/79 |
| 2003/0223751 A1 * | 12/2003 | Shimizu | H04J 14/0221 | 398/79 |
| 2006/0051012 A1 * | 3/2006 | Zhang | H04B 10/25073 | 385/27 |
| 2006/0093362 A1 * | 5/2006 | Welch | G02B 6/12026 | 398/87 |
| 2009/0274471 A1 * | 11/2009 | Bowler | H04B 10/27 | 372/29.011 |
| 2010/0124418 A1 * | 5/2010 | Noble | H04B 10/0779 | 398/9 |
| 2010/0239263 A1 * | 9/2010 | Tokura | H04B 10/296 | 398/94 |
| 2017/0170898 A1 * | 6/2017 | Fu | H04J 14/00 | |
| 2018/0269964 A1 * | 9/2018 | Mertz | H04J 14/0221 | |
| 2019/0123823 A1 * | 4/2019 | Wang | H04B 10/25751 | |
| 2019/0215073 A1 * | 7/2019 | Schmogrow | H04B 10/2916 | |
| 2019/0349113 A1 * | 11/2019 | Komiya | H04J 14/0275 | |
| 2020/0036446 A1 * | 1/2020 | Ge | H04L 25/03331 | |
| 2020/0195365 A1 * | 6/2020 | Miyabe | H04B 10/40 | |
| 2022/0034967 A1 * | 2/2022 | Strickling | G01R 31/318572 | |

* cited by examiner

PATHLOSS OPTIMIZATION FOR OPTICAL SYSTEMS

BACKGROUND

Recent developments in optical fiber communications have resulted in interchangeable components that can be swapped easily to address failures. In the drive towards lower cost, products have form factors that are increasingly smaller. While advantageous, it has been found that the transmission distance over which such systems communicate can be adversely impacted in various ways by the trend towards smaller and lower cost components. Accordingly, there remains a need to maintain the substantial transmission distances of long-distance fiber optic communication that have been previously afforded by large box communication systems, while reaping the benefits of the new paradigm of smaller, lower power components.

DETAILED DESCRIPTION

Figure 1:
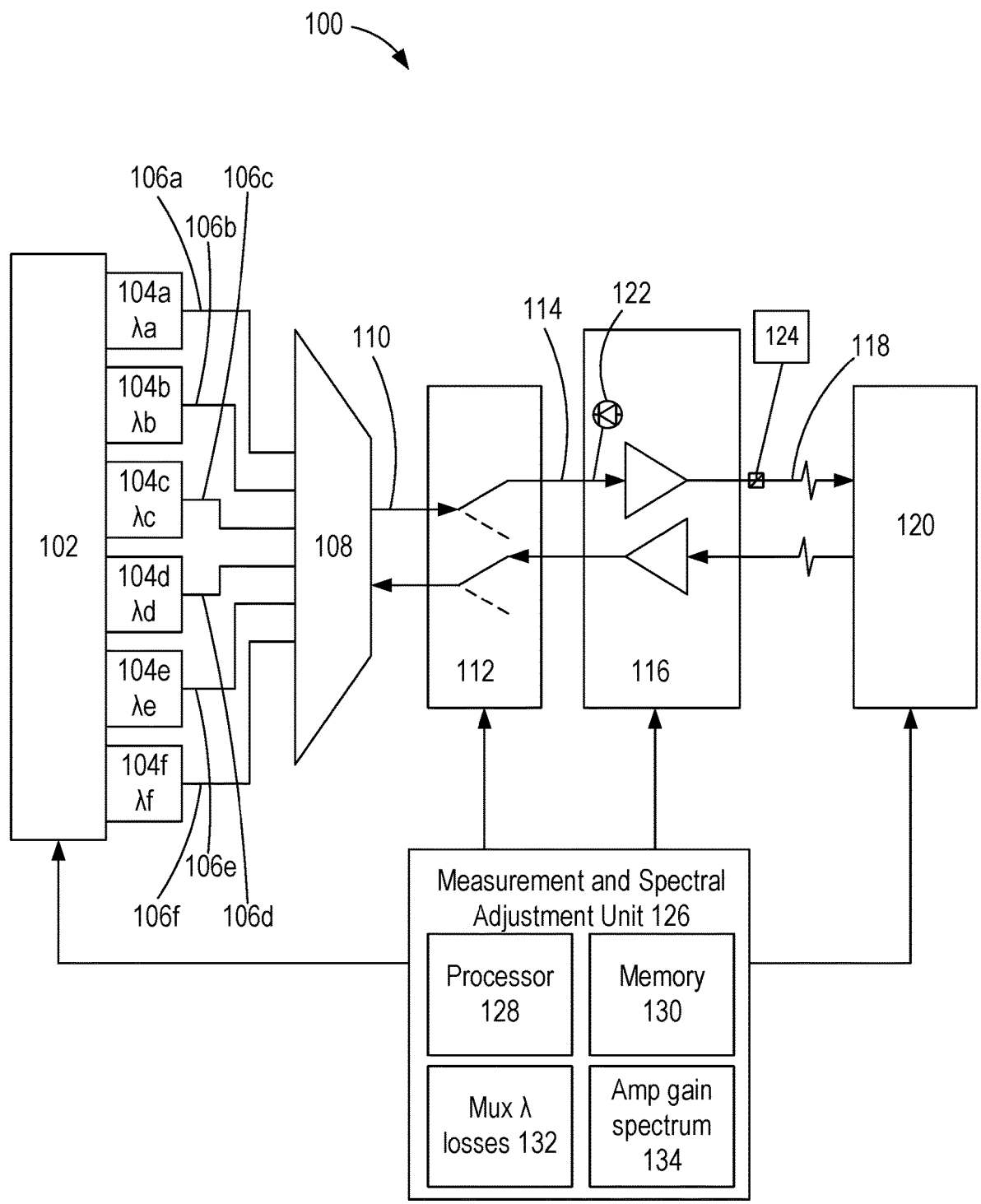
FIG. 1 is a schematic of an example of a long-distance optical communication network.

The present disclosure is directed to addressing the problem of sending data over large distances, such as 80 km or more, without significant performance degradation, particularly when the optical power output from pluggable transceiver modules is relatively low. Disclosed examples that can address this problem include, individually powering each of a number of transceivers coupled to a network switch or router while the remaining transceivers are in an off state, and then measuring a power output downstream from a multiplexer, typically at an input of an optical amplifier used to amplify the optical signals to travel over the large distance. The power measurements can then be used to provide applicable power offsets for each of the transceivers so that an optimal spectrum can be provided to the input of the optical amplifier to ensure the propagation of the signal over the large distance. Predetermined wavelength channel-specific loss from a passive multiplexer can be subtracted to determine and distinguish defects in local fiber jumpers between the transceivers and the multiplexer or between the multiplexer and the amplifier.

To send large amounts of data over an optical fiber, dense wavelength division multiplexing (DWDM) can be used. DWDM generally involves combining different wavelengths carrying independent data streams using an optical multiplexer before sending the combined data stream over a long-distance optical fiber. Recently, transceiver sources of these data signals have been miniaturized so that they can fit on host routers. For example, the 400G-ZR optical pluggable standard can provide small transceiver modules with various form factors, such as OSFP, QSFP, etc., for transmitting DWDM signals over large distances. The process of miniaturizing optical transceivers has delivered a limitation of a lower transmit (Tx) output optical power from the transceivers. While a connected optical amplifier can amplify lower power signals, the range of allowed input signal strength is not unlimited and further the lower power can introduce problems with the amplified signals, producing uneven amplification across channels, increasing noise, and reducing transmit distance. Thus, while it is important to minimize the overall loss from the transceiver output to the amplifier, as these wavelengths are combined it is also important to ensure that the overall power spread between these wavelengths entering a common optical amplifier is also minimized. Reducing this spread can ensure that no particular wavelength channel receives too much gain while another wavelength channel ends up being starved for gain. For example, when a wavelength channel becomes gain starved, an overall distance traveled while maintaining detectability at the distant receiving end of the starved channel is shorter than the detectable distance of other non-starved channels, effectively presenting a bottleneck that reduces the overall distance that the wavelength multiplexed signal can travel.

Optical communication systems for long distance communications typically include a transceiver station, often in the form of a rack-mounted arrangement of optical communication components. For example, FIG. 1 shows an example of a communication system 100 that can include a network switch or router unit 102 situated to transmit and receive various data signals. In long distance and other communications, the communication system 100 will typically include numerous optical transceivers 104a-104f, as discussed previously, which convert digital data into optical signals, often generated to propagate at different respective wavelengths λa-λf. Some communication units can include switches with 32 transceivers, though other quantities are possible. The transceivers 104a-104f are fiber-coupled with optical fiber jumper cables 106a-106f to an optical multiplexer 108 which receives and combines the optical data signals at the different wavelengths λa-λf to propagate along a common fiber path. The optical multiplexer 108 also typically can operate as a demultiplexer in the reverse direction. The transceivers 104a-104f are coupled to specific ports on the multiplexer 108. The input channels of the multiplexer 108 can typically include optical filters or internal optical components configured to reject or not couple incorrect wavelengths associated with the particular channel in producing the wavelength combined signal. In another example, the multiplexer 108 can include broadband fused optical couplers, e.g., without a channel-dependent configuration or without a wavelength division multiplexer type architecture.

The combined signal is directed out of the multiplexer 108 along a common path optical fiber jumper 110. The combined signal can be directed to various optical components, such as an optical line protection switch 112. The optical line protection switch 112 can be configured to split and switch light along two or more paths. Out of the optical line protection switch 112, the combined signal can be directed through a common path optical fiber jumper 114 to an optical amplifier 116, such as an erbium doped fiber amplifier or other optical amplification system. Alternate paths from the optical line protection switch 112 can include a separate set of components and optical amplifiers. The optical amplifier 116 increases the signal strength of the different wavelength components λa-λf of the combined signal. The amplified combined signal is then directed through a common optical fiber 118 to propagate to a distant optical fiber terminal 120, e.g., 80 km, 120 km, or farther. Example long distance communication paths can include communications between data centers.

Example transceivers 104a-104f can include miniaturized pluggable transceivers that are typically smaller, lower cost, and operating at lower powers than previous optical transceivers, and that can be plugged directly into the router unit 102. In legacy optical communication systems, transceivers and switches were relatively large separate units connected via electrical and/or optical cables. Attendant with the decrease in form factor, the optical output power of the wavelength specific data signals produced by the transceivers 104a-104f is relatively low, e.g., less than about 0.1 mW, and optical amplification is generally unavailable within the small form factor transceivers. This lower power ceiling of the pluggable transceivers can lead to uneven or poor performance with long distance communications. However, it is preferable that the communication system 100 produce signals for all of the wavelengths of the combined signal in a way that they can reach the distant optical fiber terminal 120 and be decoded error-free by transceivers at the terminal 120. At the same time, it is also preferable to maximize this communication distance. However, while error-free transmission over shorter distances is possible, e.g., 40 km, increasing propagation distances such as 100 km or more becomes increasingly difficult.

This difficulty can be associated with the optical loss and optical loss variation associated with the different wavelength channels that are locally combined by the communication system 100. Disclosed examples can provide a spectral optimization for the communication system 100 by measuring optical path losses from the optical transceivers 104a-104f to a common measurement point at an optical network position downstream from the multiplexer 108, and adjust the optical power output from the transceivers 104a-104f based on the measurements. In some examples, the optical network position for measurement can correspond to an input of the optical amplifier 116. In further examples, the position can be an output of the optical amplifier 116. In additional examples, the position can correspond to an optical network position in the distant optical fiber terminal 120, such as an input of an optical amplifier of the terminal 120. In some examples, additional measurement points along the common fiber path can be provided to determine measured intermediate losses, such as at the input and/or output of the optical line protection switch 112 or other optical components along the common fiber path. Measurement devices typically include optical detectors such as one or more photodiodes 122 that are part of the optical components, though separate optical measurement units can be used in some arrangements. In many examples, using one or more optical detectors built into the units is preferred so that spectral optimization can be provided for installed fiber arrangements, including discerning one or more defects associated with installed fiber jumpers. As shown in FIG. 1, the photodiode 122 can be situated in the optical amplifier 116 and optically coupled to receive a small portion of the input light, e.g., with a beam pickoff or beam splitter. Optical amplifiers typically include an internal optical detector at the input so that a specific amount of gain can be provided at the output based on the internal measurement. The internal pump lasers of the optical amplifier typically use the detected measurements to provide the output power at a controlled ratio relative to the input power in relation to a gain setpoint.

Optical losses can be defined across various sections of the optical fibers and optical fiber components from the optical source at the transceivers 104a-104f to various optical network positions optically downstream from the transceivers 104a-104f. A first loss section can correspond to the set of optical fiber jumpers 106a-106f optically coupling the respective transceivers 104a-104f and the inputs of the multiplexer 108. The loss for each jumper in this section can vary from one to the next, e.g., during fiber manufacture, fiber coupler fabrication, fiber to fiber-coupler connectorization, and/or installation of the optical fiber jumpers 106a-106f into the optical communication system 100. Further, for passive optical multiplexers, the first loss is typically not directly measurable in an installed arrangement of optical fibers. A second loss section can correspond to the wavelength channel paths through the optical multiplexer 108, each having a respective loss specific to the channel. In representative examples, the optical multiplexer 108 is a passive multiplexer, which is a common type of multiplexer with lower associated cost. Passive multiplexers generally lack an internal optical power measurement capability making direct measurement of a loss in the second section of an installed multiplexer impossible or impractical. However, when the multiplexer 108 is manufactured there is often a measurement of each path loss for each input port wavelength to the common output, and that calibration data can be available from a specification sheet.

A third loss section can correspond to the common path along the optical fiber jumper 110 coupling the multiplexer 108 to the optical line protection switch 112 (if present). In many examples, this third loss is not directly measurable because the optical multiplexer 108 is a passive device. A fourth loss section can correspond to the common path through the optical line protection switch 112. Similar to the multiplexer 108, the optical line protection switch 112 can include a calibrated loss determined at manufacture. A fifth loss section can correspond to the common path through the optical fiber jumper 114 coupling the optical line protection switch 112 (or multiplexer 108) to the optical amplifier 116. In some examples, comparison of real-time optical power measurements at the input of the optical amplifier 116 and a power measurement from an output of the optical line protection switch 112 can be used to determine power measurements for the loss across the fifth los section. Alternatively, the optical line protection switch 112 may include a photodiode for optical power measurement at the input and provide a power level at the output based on internal losses known from the fourth loss section. In further examples, additional loss sections can correspond to other optical components or optical fiber lengths between the optical transceivers 104a-104f and the optical amplifier 116 or between the optical amplifier 116 and the distant terminal 120.

In disclosed examples, the fiber distance over which a combined signal is sent, from the transceivers 104a-104f to the distant terminal 120, can be maximized by providing the optical amplifier 116 with a predetermined optical power spectrum across the wavelengths $\lambda a$-$\lambda f$ at the amplifier input. This can provide the signals at the wavelengths $\lambda a$-$\lambda f$ with amplified signal power amounts at the output of the amplifier 116 that are associated with a longer detectable and decodable propagation distance for the combined signal than if the optical signal input powers for the different wavelength channels at the optical fiber amplifier input were left unadjusted. In some examples, the predetermined optical power spectrum at the input of the amplifier 116 is a flat spectrum, i.e., power levels for the wavelengths $\lambda a$-$\lambda f$ are approximately the same. For example, a flat spectrum can include a power variation of 5%, 2%, 1%, 0.1%, or smaller across the different signals at the wavelengths λa-λf. In further examples, the predetermined optical spectrum at the input of the amplifier 116 is non-flat and tailored so that the individual optical powers at the input produce a flat amplified power spectrum at the output of the optical amplifier 116. In still further examples, the predetermined optical spectrum at the input of the amplifier 116 is non-flat and tailored so that the individual optical powers at the input produce a flat amplified power spectrum/equal optical signal quality at the distant terminal 120.

With the different optical losses produced across the various loss sections, disclosed examples of the communication system 100 can be configured to produce predetermined power spectrum profiles, including for systems in which the optical multiplexer 108 is a passive device without optical power monitoring taps and the optical fiber jumpers between the transceivers 104a-104f and multiplexer 108 and other common fiber paths are connected in an operational communication arrangement. Expensive and elaborate arrangements could be constructed to monitor power and adjust power spectral profiles, e.g., using wavelength selective switches (WSS), optical channel monitors (OCM), or with a complex arrangement of photodiodes and real-time power monitoring at each input/output of the multiplexer 108, at each input and/or output of intermediate components, such as the optical line protection switch 112, optical amplifier 116, multiple points at arbitrary optical network positions along the optical communication path, etc. However, such arrangements are typically applied in ROADM and long-haul links and these arrangements are impractical and not cost-effective or justifiable for high-volume and point-to-point links.

In line with the drive towards simplicity and pluggability, the optical power outputs of the pluggable transceivers 104a-104f tend to be limited generally to a lower power. For example, pluggable examples of the transceivers 104a-104f can be limited to output power ranges of about 0.1 mW, which is approximately ten times lower output power than a bulkier transceiver box with optical fiber jumper couplings to a proximate network router typically producing optical outputs in the range of 0-3 dBm. The relatively low power outputs become more sensitive to the losses of the various sections, thereby limiting the extent of the transmission distance if the power outputs are not managed in relation to the propagation distance. For example, with higher optical output powers from other transceivers, a variation between the different wavelength channels at the input of the optical amplifier 116 does not significantly impact a detectable and decodable transmission distance for a combined signal making the power output of the transceivers less of a factor to consider. For lower optical output powers from the transceivers 104a-104f, the optical power for the different wavelengths that is received by the optical amplifier 116 can vary by several dB across the wavelengths λa-λf due to the different path losses encountered by the wavelengths through the multiplexer 108 or other wavelength-dependent loss components. The aggregate and uneven losses between the transceivers and the optical amplifier 116, and in some instances by the wavelength dependent gain profile of the amplifier 116, can result in a limited reach for the combined long distance signal.

Disclosed examples can measure or provide measurements of optical losses for each of the wavelengths λa-λf for the optical paths from the respective transceiver 104a-104f to a downstream optical network position after the channels are combined with the optical multiplexer 108, e.g., the input of the optical amplifier 116. In representative examples, predetermined calibration-based optical loss values obtained prior to the assembly of the optical communication system 100 into an operational arrangement of optically coupled fibers and components are used together with measurement data obtained from the arrangement in a communication ready state to determine optical power offsets for the optical transceivers 104a-104f.

For example, at the time of manufacture of the multiplexer 108, the internal losses for the different wavelengths λa-λf from the multiplexer input to the combined output can be measured and recorded as a set of wavelength specific loss values. This set of data can be accessed and used to determine the optical power offsets for the optical transceivers 104a-104f. In some examples, to provide optical power offsets for the transceivers 104a-104f, each optical transceiver is individually powered with the other transceivers in an idle/off state, and the measurements of the different wavelength channel optical powers are measured at an optical network position downstream from the optical multiplexer 108, e.g., with the optical detector 122 at the input of the optical amplifier 116. The predetermined calibrated optical losses for the multiplexer 108 describing internal path-specific loss can then be subtracted from the measured losses to provide a set of partial path losses. The partial path losses include a combination of the loss from the specific optical fiber jumper 106a-106f and the common loss between the output of the multiplexer 108 and the optical network position where the optical power is measured.

In many examples, the partial path losses can present a distribution of loss that varies across the wavelengths λa-λf. From the distribution of losses and loss amounts, loss defects associated with the common path optical fibers, e.g., fibers 110, 114, or the transceiver jumpers 106a-106f, can be identified. Corrective actions to reduce loss can include cleaning, reinserting, re-routing, or replacing defective cables. In some examples, loss distribution analysis can be performed by using an estimate for an expected total optical loss based on a maximum loss threshold (e.g., based on a component specification) for each of the optical fiber jumper cables. In an example, a maximum loss threshold can be 0.25 dB for each of three optical jumpers 106a, 110, 114. This maximum loss (or an aggregate of maximum loss thresholds for a series of common path jumpers) can be compared to partial path loss values. For example, a computed partial loss value above 0.75 dB can indicate that a defect is present in one or more of the optical fiber jumpers 106a, 110, 114. Optical power measurements at the optical line protection switch 112 can be used to discern between defects among the optical jumpers 106a, 110, 114 in some examples.

An increasing quantity of the transceivers 104a-104f can improve the ability to discriminate between defects before the multiplexer, e.g., in the cables 106a-106f, or downstream from the multiplexer up to the optical network position or positions where optical power measurements are obtained. Expected nominal losses for a set of similar optical cables can follow a probability distribution provided through a specification or observation, such as a normal distribution, flat distribution, etc., having respective averages and variances. Thus, the path losses associated with the transceiver cables 106a-106f will generally introduce a distribution of loss to the computed partial path losses while the common path optical cables downstream from the optical multiplexer 108 will introduce a series of separate path loss increments. From the distribution of partial losses, a minimum loss value can be determined, as well as one or more other partial loss distribution parameters, such as averages, variations, and/or maximum losses.

In some examples, the variation in the distribution of partial losses can be compared to an expected nominal variation for the transceiver fibers 106a-106f to determine whether a defect can be likely attributed to one of the transceiver fibers 106a-106f. Expected nominal variations can be determined by the manufacturer or other entity through testing or analysis. One or more of the partial losses that is higher than the other partial losses can be considered defective, e.g., associated with manufacture and/or installation. Some example fibers that are considered defective can exhibit a loss that is higher than normal but that is otherwise within an acceptable manufacture specification, so that such fibers can be replaced or swapped to other channels to improve a power range capability of one or more of the transceivers 104a-104f. An improvement in the power range capability of one or more of the transceivers 104a-104f can allow more range flexibility in tailoring a spectral profile at the input of the optical amplifier 116.

In some examples, an average or maximum loss in the partial loss distribution can be compared to expected nominal or maximum loss or losses along the optical fiber path between the transceivers 104a-104f and the optical network position (e.g., the optical amplifier) where the optical power measurements are performed. For partial loss values that are higher than expected loss values, the comparison can indicate a defect in one or more of the optical fibers along the common fiber path downstream from the multiplexer. Such a defect can indicate that an optical fiber requires replacement or cleaning and reattachment, for example. Thus, while disclosed examples can be used to identify an excessive loss variation among the wavelengths $\lambda a$-$\lambda f$ so that the variation can be reduced, minimized, or adjusted to correspond to a predetermined spectral profile, excessive loss also can be identified in common path optical fiber jumpers so that such loss can also be reduced below a threshold limit of the optical amplifier 116 to compensate for a lossy input signal.

From the measured and computed losses, optical power offsets can be determined for the transceivers 104a-104f that adjust the optical powers so that the transmitted signals are received by the optical amplifier 116 with a selected spectral profile, e.g., flat. Power offsets can be applied after the common path optical fiber jumpers have losses that are within specification or sufficiently low to allow a suitable power range to be delivered from the transceivers 104a-104f to the optical amplifier 116. In representative examples, power offsets correspond to reductions in optical output power for the wavelengths $\lambda a$-$\lambda f$ so that the net effect of propagation of the optical signals through the optical path is a predetermined optical power spectral profile at the input of the optical amplifier 116. For example, the optical output power of each transceiver 104a-104f except for a lowest one (or an effectively lowest one) can be reduced by a calculated offset so that the power of each of signal wavelengths $\lambda a$-$\lambda f$ reaches the optical amplifier 116 at the same power level or another predetermined profile associated with increasing transmission distance for the combined signal. In further examples, power offsets can include both power reductions and power increases for different wavelengths $\lambda a$-$\lambda f$ to provide a suitable spectral profile at the input of the optical amplifier 116. The power offsets that reduce a variation across the wavelength channels at the input of the optical amplifier 116 can be limited by or selected in relation to gain settings and constraints of the amplifier 116 and the power capability of the transceiver type that can be used to communicate to the distant terminal 120. For example, a lowest power transceiver option can be desirable but reduces the maximum power achievable at the optical amplifier 116, and further increases the significance of signal variability across the wavelengths $\lambda a$-$\lambda f$.

In general, it is counterintuitive to reduce the power of the signals by the determined offsets because in many lower cost examples of the communication system 100 the transceivers 104a-104f are small form-factor pluggable optical transceivers, which already suffer from a limited maximum optical output power. However, by selectively reducing power of various channels within reasonable limits, e.g., through the optical transceivers 104a-104f or the multiplexer 108, and increasing a gain of the optical amplifier 116 within reasonable limits, an optimized spectral profile can be obtained that can increase transmission distance for all channels. Gain increases applied by the optical amplifier 116 are generally limited to the extent to which noise is added to the channels by the optical amplifier 116. Thus, offsets can be provided that lower each channel power to a level defining a spectral power profile for the optical amplifier 116, such that the negative impact from the offsets is lower as compared with the impact on transmission distance from the variation among the optical powers of the wavelengths $\lambda a$-$\lambda f$ received and amplified by the optical amplifier 116.

In some examples of the communication system 100, the gain spectrum of the optical amplifier 116 can be used in selecting the power offsets. For example, an amplifier's gain profile can be wavelength-dependent, and offsets can be provided such that the input spectral power profile for the wavelengths $\lambda a$-$\lambda f$ at the input of the optical amplifier 116 can be non-flat such that the output spectral profile is equal across the signal wavelengths $\lambda a$-$\lambda f$. To determine the offsets, the output spectrum of the optical amplifier 116 can be measured with an internal or external photodiode detecting power for each separate wavelength. Alternatively, a pre-measured gain spectrum, e.g., as defined at manufacture or before installation, can be used to determine the offsets. In further examples, optical power and optionally a noise profile can be measured at the distant terminal 120, and offsets can be selected to correct for performance variation across the wavelengths $\lambda a$-$\lambda f$, e.g., pre-emphasizing one or more of the wavelengths $\lambda a$-$\lambda f$. In some instances, wavelength dependent loss variation associated with the propagation along distance fiber 118 can be obtained from a calibrated or manufacture specification for the fiber rather than or in addition to power measurements at the terminal 120.

In some examples, optical power measurements can be provided by an optical channel monitor 124 which can be configured to detect power across multiple wavelengths. The optical channel monitor 124 can extract power level data for each of the signals sent simultaneously from the optical transceivers 104a-104f. The detected power variation can be used to determine adjustments to the power of the different wavelengths $\lambda a$-$\lambda f$ to be provided as an input to the optical amplifier 116. As shown the optical channel monitor 124 is situated at an output of the optical amplifier 116, though it will be appreciated that it can be located at other internal or external positions along the optical communication fiber path.

FIG. 1 shows a general schematic of a measurement and spectral adjustment unit 126 that can be used to extract data from the communication system 100 and/or coordinate channel test measurements so that corresponding power offsets for the transceivers 104a-104f or multiplexer 108 can be provided to spectrally optimize long distance optical communication. The unit 126 can be configured in a suitable computing environment in which the described innovations can be implemented. As shown, the depicted environment is not intended to suggest any limitation as to scope of use or functionality, as the innovations may be implemented in diverse general-purpose or special-purpose computing systems. For example, the computing environment can be any of a variety of computing devices (e.g., desktop computer, laptop computer, server computer, tablet computer, etc.) and can be coupled to various processors, controllers, and/or I/O of the various components of the communication system 100 in order to provide the described innovations.

The communication system 100 is typically arranged with various components in a rack-based chassis. For example, the transceivers 104a-104f can be plugged into the router 102 and can be arranged in a chassis with other components of the communication system 100 arranged on cards plugged into the chassis. The cards can include respective processors and a chassis controller can communicate with the different processors. The unit 126 can include with one or more processors 128 and memories 130, with the processor 128 executing computer-executable instructions that can be stored in the memory 130. Various processors can be used, including general-purpose central processing unit (CPU), processor in an application-specific integrated circuit (ASIC) or any other type of processor. The memory 130 may be volatile memory (e.g., registers, cache, RAM), non-volatile memory (e.g., ROM, EEPROM, flash memory, etc.), or some combination of the two, accessible by the processor 128.

The memory 130 can store software implementing one or more innovations described herein, in the form of computer-executable instructions suitable for execution by the processor 128. For example, the unit 126 can determine offsets in various ways, such as by using measurements obtained from one or more optical network positions in the communication system 100 and calibration data (which can be preloaded on the unit 126, e.g., as calibrated multiplexer wavelengths losses 132). Some units can use amplifier gain spectral data 134. Further examples can use calibration and/or loss data associated with other optical components of the communication system 100 in determining power offsets and/or optical fiber defects, such as other components with path dependent loss including losses that are not wavelength dependent, additional optical amplifiers, etc. The unit 126 can be in communication with the transceivers 104a-104f, e.g., through the router 102, and/or multiplexer to provide adjust optical power. In representative examples, the power adjustments are provided during deployment rather than on a continual or real-time basis. Communication between the unit 126 and components of the communication system 100 can be wired and/or wireless.

Figure 2:
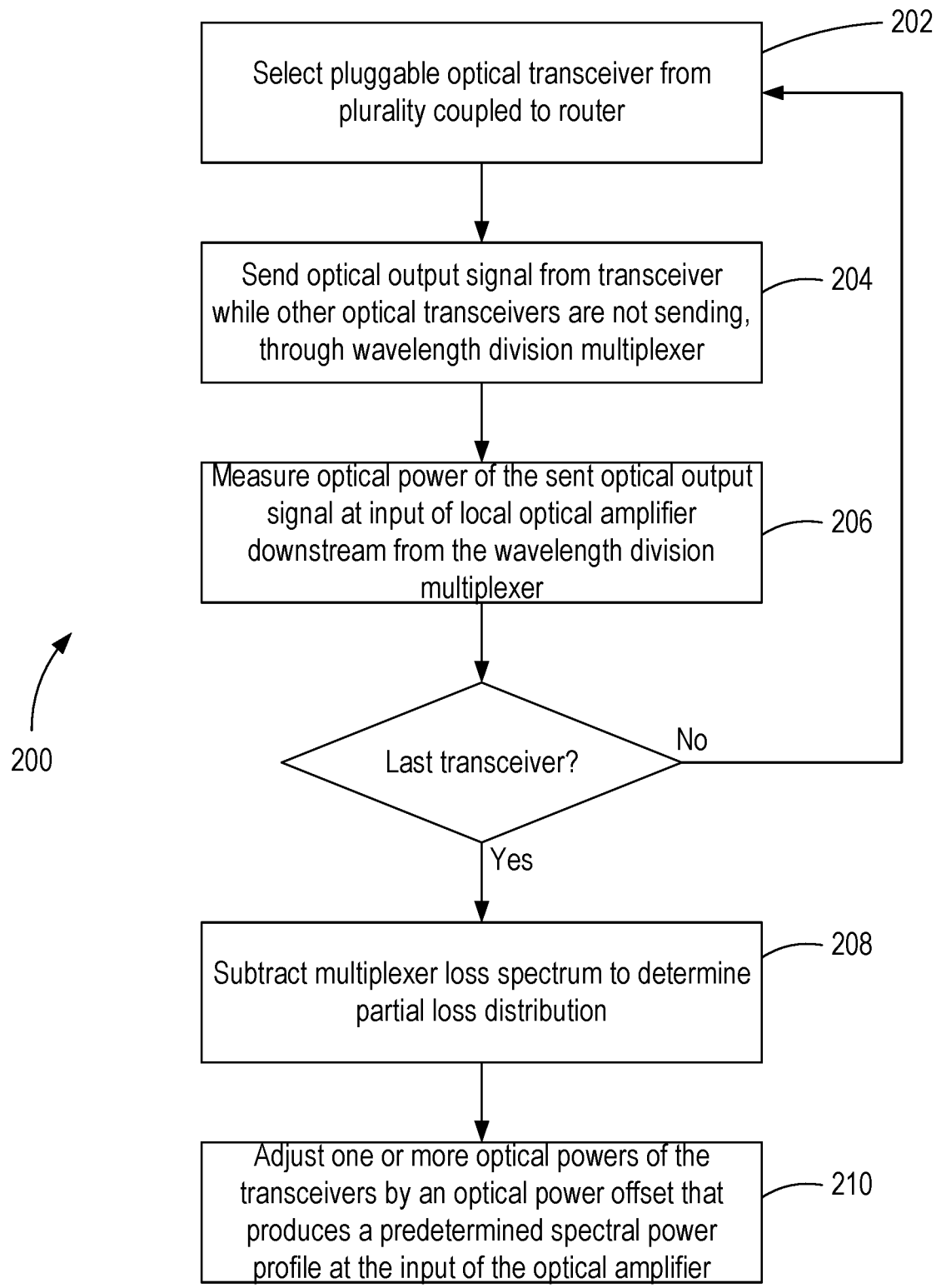
FIG. 2 is a flowchart of methods that can be used to optimize a transmission distance for the optical communication network in FIG. 1.

FIG. 2 is an example method 200 of the various methods described above for providing optical power offsets to adjust a power spectral profile received by an optical amplifier in a long distance communication network. At 202, a router includes a plurality of pluggable optical transceivers coupled to its communication ports, and one of the plurality of transceivers is selected. At 204, an optical output signal is sent from the transceiver while the other transceivers are not sending optical power. Each of the transceivers is fiber-coupled to a local wavelength division multiplexer/demultiplexer which combines the wavelength signals received from the transceivers to form a combined signal that is coupled to an optical amplifier. At 206, the optical power of the one optical output signal that was sent is measured at an input of the optical amplifier, which is locally downstream from the wavelength division multiplexer. The process can be repeated for the remaining transceivers to obtain similar measurements. In some examples, at 208, a predetermined wavelength specific pathloss through the multiplexer is subtracted from the distribution of losses associated with the measurements. Pathlosses can be predetermined for a specific multiplexer or multiplexer type, e.g., as provided by a manufacturer specification or through testing. At 210, the optical power outputs of the transceivers are each adjusted, typically by reducing the already small amount of optical output power, by an optical power offset informed by the distribution of losses or partial losses in order to produce a predetermined spectral power profile at the input of the optical amplifier. In representative examples, this predetermined spectral power profile is flat or otherwise configured to increase a transmission distance over which the amplified signals can propagate and remain decodably detectable at a distant terminal, e.g., 50 km, 80 km, 100 km, or more.

Figure 3:
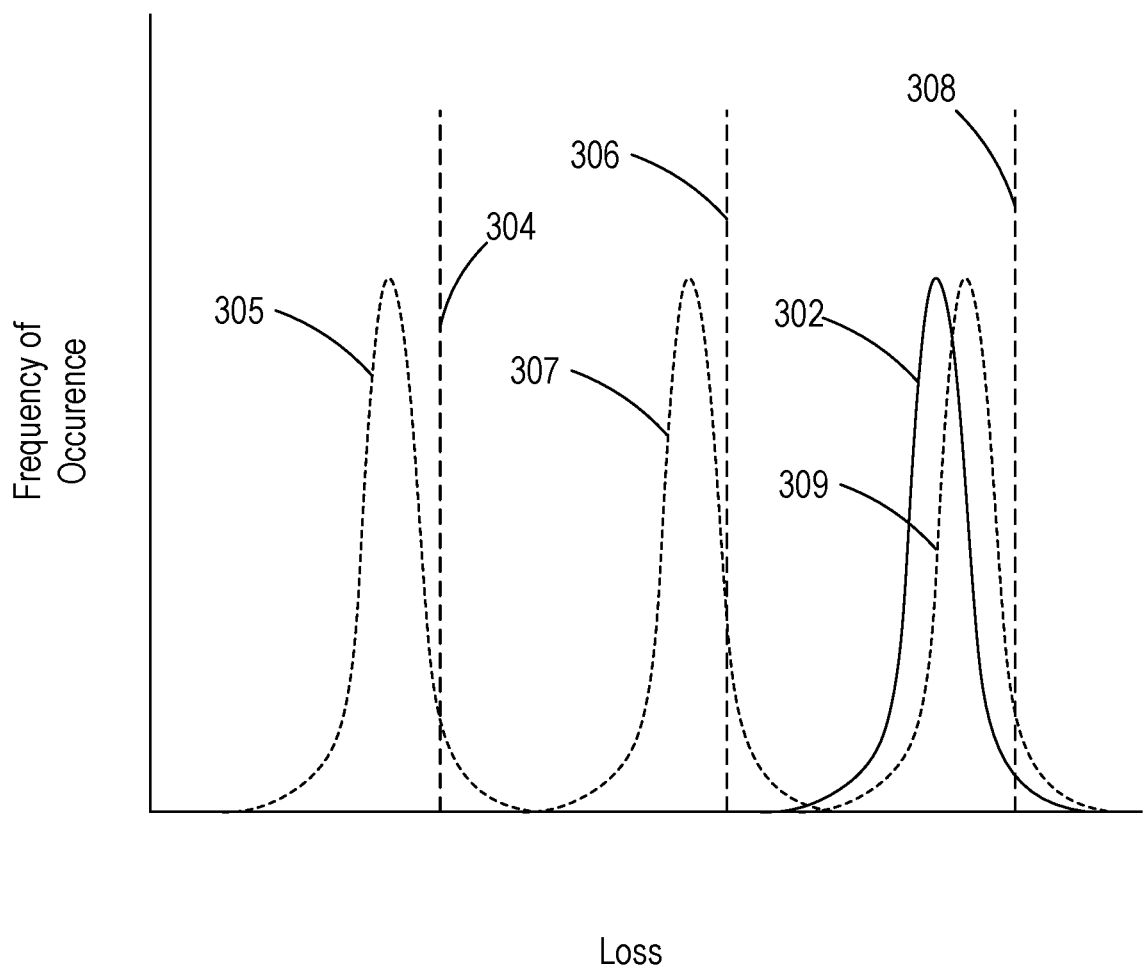
FIG. 3 is a graph of frequency of occurrence for losses measured at an optical amplifier for a plurality of optical transceiver channels.

FIG. 3 is a graph 300 of the frequency of occurrence of a wavelength channel loss as measured at an optical amplifier, after wavelength specific signals are generated by respective optical transceivers and directed through a multiplexer, an optical line protection switch, and related optical fiber jumpers, before being received by the optical amplifier. A loss distribution 302 illustrated as a continuous line shows a hypothetical set of measured losses at the optical amplifier for a set of the wavelength specific signals produced by the optical transceivers (e.g., 64), after subtracting predetermined internal losses of the multiplexer and optical line protection switch. Lines 304, 306 show expected maximum losses, shown in addition, associated with fiber jumper cables configured to propagate a combined beam. Line 304 shows the expected loss for the jumper connecting the multiplexer to the optical line protection switch, e.g., in relation to an expected loss distribution 305 for the jumper type. Line 306 shows the expected loss for the jumper connecting the optical line protection switch to the optical amplifier, e.g., in relation to an expected loss distribution 307 for the jumper type. Line 308 shows an expected maximum loss (e.g., one or more standard deviations from a mean value), shown in addition relative to line 306, associated with the plurality of fiber jumper cables (typically of a common type) that connect the optical transceivers to the multiplexer, e.g., in relation to an expected loss distribution 309 for the jumper type. An observed shift of the distribution 302 to the right (e.g. where one or more standard deviations from the mean exceed the loss corresponding to line 308) can indicate a defect in the common path optical fiber jumpers downstream of the multiplexer. An average (e.g., mean, median) of the distribution can be used to indicate such a defect. Other characteristics of the loss distribution 302, such as a maximum loss, can also be used to indicate a defect or an absence of a defect in a common fiber jumper, as each of the signals propagates along the common path optical fiber jumpers and there is typically less wavelength-dependent loss associated with defects in the jumpers. Variation or outliers of the distribution can indicate a defect in a corresponding optical fiber jumper connecting the optical transceiver to the multiplexer.

Figure 4A:
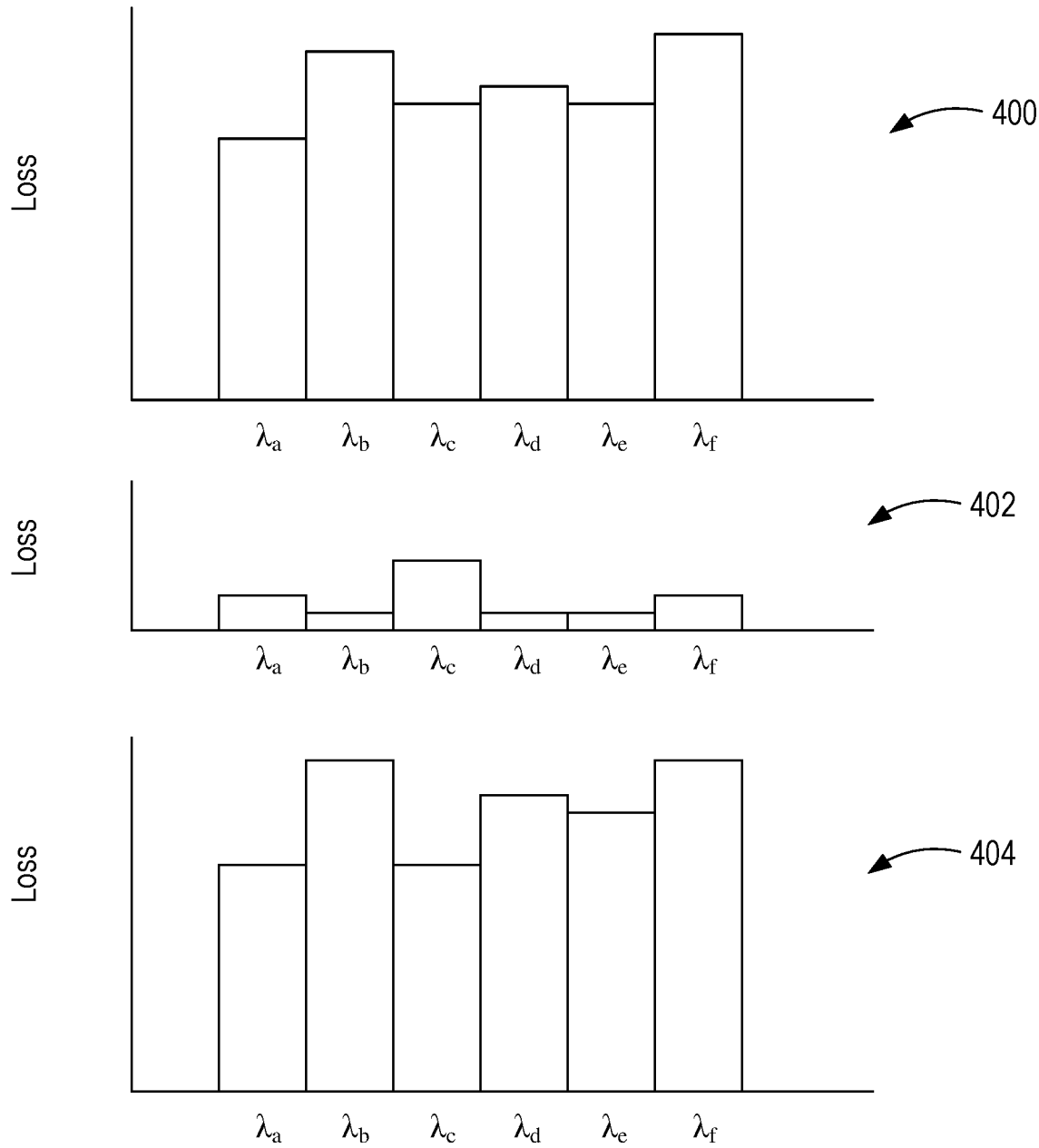
FIG. 4A is a series of graphs of optical loss for various wavelength channels.
Figure 4B:
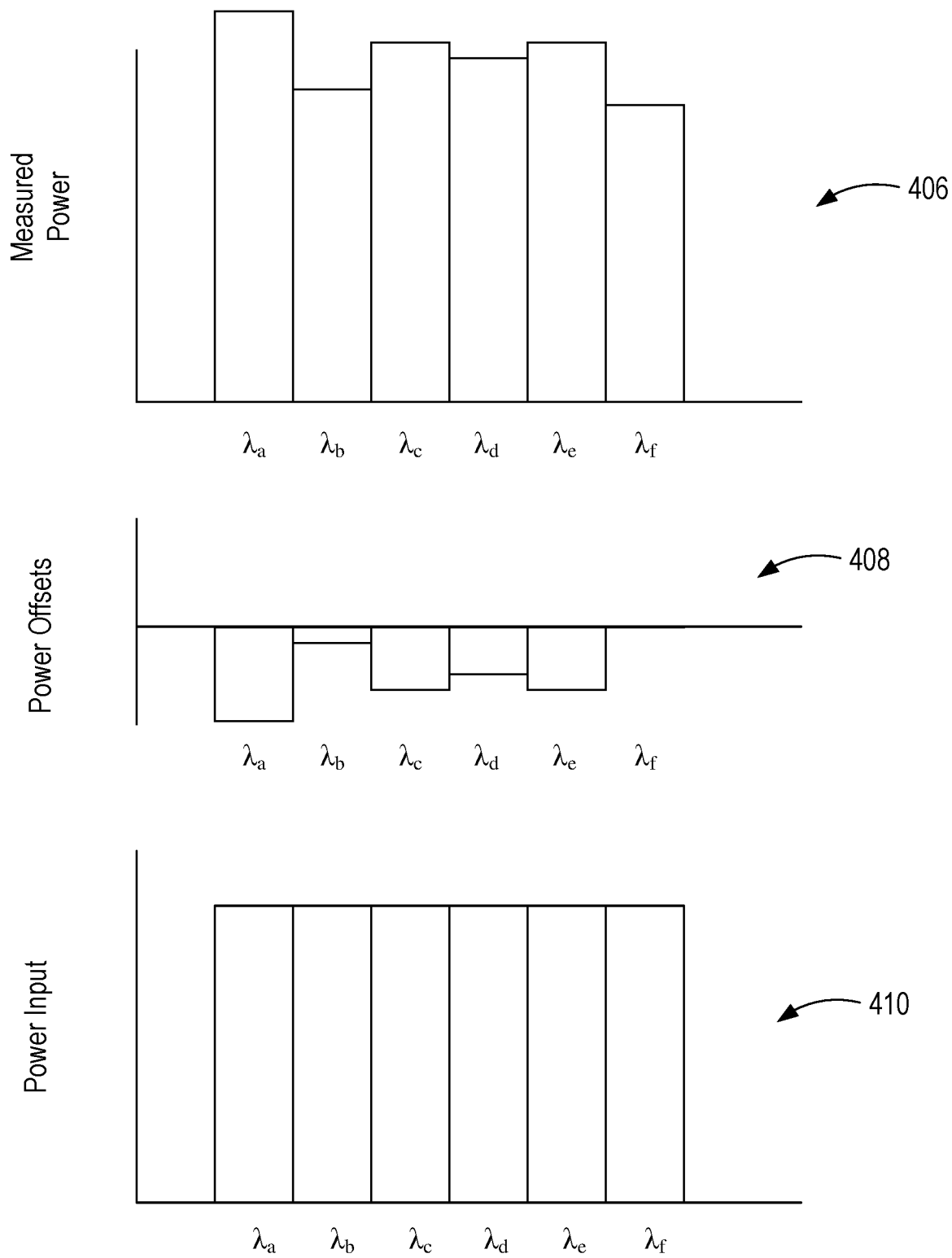
FIG. 4B is a series of graphs of optical power for various wavelength channels, including offsets determined, and an optimized spectral profile.

FIG. 4A shows graphs 400, 402, 404 depicting loss for different wavelength channels. Graph 400 shows a loss based on a measured power at an optical amplifier input shown in FIG. 4B, graph 406. Different wavelength channels experience different optical loss based on propagation through various optical components such as fiber jumper cables. Graph 402 shows a predetermined loss profile for a multiplexer for the different wavelength channels. Loss profiles can be obtained, e.g., from a manufacturer specification sheet or through testing. Testing can involve directing specific wavelengths at a common power through respective wavelength channels and measuring the loss for the different wavelength channels. Graph 404 shows a partial loss profile with the multiplexer loss from graph 402 subtracted from the measured loss at graph 400. The distribution of partial losses in graph 404 can be used to determine transceiver errors, common path fiber defects, transceiver jumper cable defects, as well as other information about the different wavelength channel performance. FIG. 4B shows a graph 406 of measured power, e.g., at an optical amplifier input. Graph 408 shows power offsets that are computed based on the measured power to obtain the power spectral profile shown in graph 408. While the profile in graph 408 is flat, other shapes are possible, including shapes that produce selected flat profiles at the output of the optical amplifier or at a distant terminal location at the receiving end of a long-distance optical fiber data transmission.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASIC s), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:
1. A method, comprising:
for each of a plurality of pluggable optical transceivers being fiber-coupled to respective inputs of a passive wavelength division multiplexer having a predetermined loss profile, the predetermined loss profile defining a path-specific loss between each input and a common output,
sending an optical output signal along an optical signal path while the other optical transceivers of the plurality are not sending optical output signals, and
measuring an optical power of the sent optical output signal at an input of a local optical amplifier downstream from an output of the wavelength division multiplexer, wherein the local optical amplifier is configured to transmit the optical output signals to a location at least 50 km distant; and
based on the measured optical powers:
determining a loss distribution across the optical output signals at the input of the local optical amplifier by subtracting the predetermined path specific losses of the wavelength division multiplexer;
comparing a variation in the loss distribution to a nominal variation to determine a defect in a transceiver fiber path associated with a higher loss component of the distribution where the variation exceeds the nominal variation;
comparing an average or maximum loss in the loss distribution to a nominal average or maximum allowable loss to determine a defect in a common fiber path downstream from the wavelength division multiplexer; and adjusting one or more of the optical powers of the optical output signals produced by the optical transceivers before transmission through the wavelength division multiplexer, by an optical power offset that produces a predetermined flat optical power spectrum profile at the input of the local optical amplifier and that increases a transmission distance over which the optical output signals decodably propagate.

2. A method, comprising:
for each of a plurality of optical transceivers fiber-coupled to respective inputs of an optical multiplexer, sending an optical output signal along an optical signal path while the other optical transceivers of the plurality are not sending optical output signals, and measuring an optical power of the sent optical output signal at an optical network position downstream from an output of the optical multiplexer; and
based on the measured optical powers, adjusting one or more of the optical powers of the optical output signals transmitted through the optical multiplexer by an optical power offset that produces a predetermined optical power spectrum profile at the optical network position.

3. The method of claim 2, wherein the optical multiplexer is a passive multiplexer having a predetermined loss profile defining a path specific loss between each input and a common output of the optical multiplexer;
wherein the adjusting comprises adjusting the one or more of the optical transceivers by an optical power offset that produces the predetermined optical power spectrum profile at the optical network position.

4. The method of claim 2, further comprising:
determining a loss distribution across the optical output signals at the optical network position by subtracting the predetermined path specific losses of the optical multiplexer.

5. The method of claim 4, further comprising:
comparing a variation in the loss distribution to a nominal variation to determine a defect in a transceiver fiber path associated with a higher loss component of the distribution where the variation exceeds the nominal variation.

6. The method of claim 4, further comprising:
comparing an average or maximum loss in the loss distribution to a nominal average or maximum allowable loss to determine a defect in a common fiber path downstream from the optical multiplexer.

7. The method of claim 4, wherein the optical signal path includes a local optical amplifier situated to receive a multiplexed optical signal from the optical multiplexer to transmit over a large distance.

8. The method of claim 7, wherein an input of the optical amplifier corresponds to the optical network position and includes a photodiode configured to provide the optical power measurements.

9. The method of claim 8, wherein the optical signal path includes at least one optical component serially coupled between the optical multiplexer and the optical amplifier, wherein the at least one optical component has a predetermined loss profile for transmission of the optical output signals.

10. The method of claim 9, wherein the determining the loss distribution across the optical output signals at the optical network position further includes subtracting the predetermined loss profile of the at least one optical component.

11. The method of claim 9, wherein the at least one optical component includes an optical line protection switch.

12. The method of claim 9, further comprising:
measuring an optical power of the sent optical output signal at the at least one optical component; and
comparing the measured optical power to the measurement at the optical network position to determine the presence of a defect in a common fiber path between the at least one optical component and the optical network position or between the optical multiplexer and the optical amplifier.

13. The method of claim 7, wherein the adjusting comprises adjusting the one or more of the transceivers by an optical power offset that produces a flat optical power spectrum profile at the input of the local optical amplifier.

14. The method of claim 7, wherein the adjusting comprises adjusting the one or more of the transceivers by an optical power offset that produces a non-flat optical power spectrum profile for the multiplexed optical signal at the input of the local optical amplifier that produces a flat optical power spectrum profile for the multiplexed optical signal at the output of the local optical amplifier.

15. The method of claim 7, wherein the adjusting comprises adjusting the one or more of the transceivers by an optical power offset that produces a non-flat optical power spectrum profile for the multiplexed optical signal at the input of the local optical amplifier that produces a flat optical power spectrum profile for the multiplexed optical signal at a terminal position at the large distance.

16. The method of claim 15, wherein the large distance is at least 50 km.

17. The method of claim 2, wherein the optical transceivers are pluggable modules configured to plug into a network switch.

18. One or more computer-readable media comprising computer-executable instructions that, when executed, cause a computing system to:
for each of a plurality of optical transceivers fiber-coupled to respective inputs of an optical multiplexer, send an optical output signal along an optical signal path while the other optical transceivers of the plurality are not sending optical output signals, and measure an optical power of the sent optical output signal at an optical network position downstream from an output of the optical multiplexer; and
based on the measured optical powers, adjust one or more of the optical powers of the optical output signals transmitted through the optical multiplexer by an optical power offset that produces a predetermined optical power spectrum profile at the optical network position.

19. The method of claim 2, wherein the predetermined optical power spectrum profile is selected to increase a transmission distance over which the optical output signals decodably propagate.

* * * * *